Nov. 22, 1960   R. E. MOELLER ET AL   2,961,046
FEEDING AND COUNTING SYSTEM FOR INJECTING
BALLS INTO A FLOW STREAM
Filed May 26, 1958   2 Sheets-Sheet 1

INVENTORS
Robert E. Moeller
Joel M. Stogner
BY
Earl Babcock.

Nov. 22, 1960    R. E. MOELLER ET AL    2,961,046
FEEDING AND COUNTING SYSTEM FOR INJECTING
BALLS INTO A FLOW STREAM
Filed May 26, 1958    2 Sheets-Sheet 2
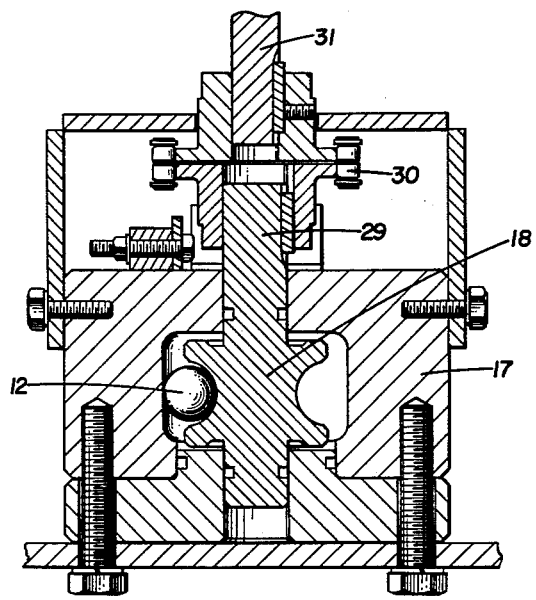
FIG. 2
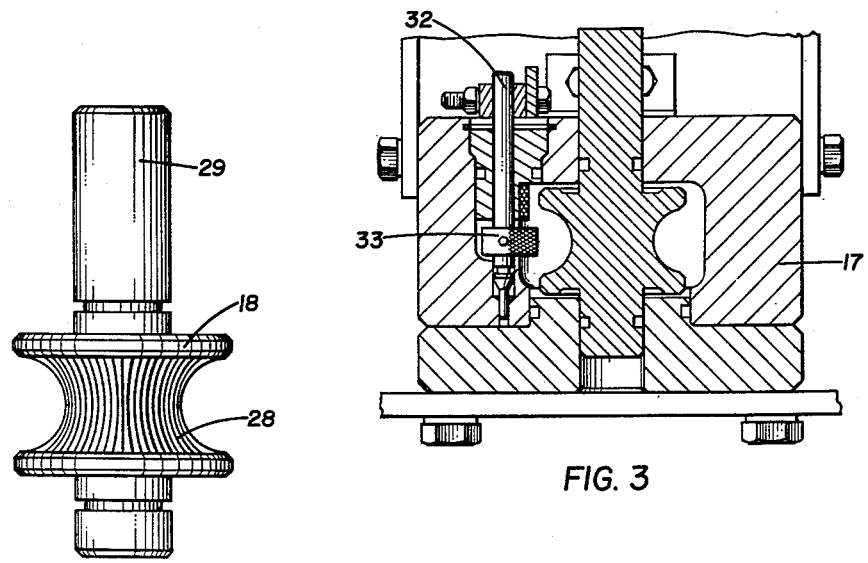
FIG. 4
FIG. 3
INVENTORS
Robert E. Moeller
Joel M. Stogner
BY
Earl Babcock.

United States Patent Office 2,961,046
Patented Nov. 22, 1960

2,961,046

FEEDING AND COUNTING SYSTEM FOR INJECTING BALLS INTO A FLOW STREAM

Robert E. Moeller and Joel M. Stogner, Duncan, Okla., assignors to Halliburton Oil Well Cementing Company, Duncan, Okla.

Filed May 26, 1958, Ser. No. 737,716

2 Claims. (Cl. 166—75)

This invention relates to a system for feeding and counting balls as they are injected into a stream of liquid being pumped into an oil well or the like, and more particularly to a system using pneumatic and electric power commonly available on an automotive truck for controlling the injection operation and keeping track of the number of balls injected.

In the copending application of Joel M. Stogner et al., Serial No. 701,219, filed December 6, 1957, there is disclosed an assembly for injecting balls into a flow stream. The present invention relates to improvements on such apparatus as is there disclosed, and those disclosed in the other copending applications therein cited.

As disclosed in said earlier applications, balls made of rubber or other somewhat flexible or elastic materials are now commonly used in oil wells to plug perforations in pipe when desired. Sometimes these balls have to be injected into a stream of fluid under very high pressure, for example, 10,000 pounds per square inch. The pump for forcing the fluid into the well is normally mounted on a truck, and the truck is provided with conventional air brakes and an electrical system, so that a source of both air pressure and electricity is available.

In accordance with the present invention, a cartridge containing a number of balls is connected in parallel with a conduit normally conveying fluid under pressure and then a pneumatically operated motor connected to the air supply on a truck is used to actuate a rotary ball feeder. At the same time an electrical switch is associated with the feeder in such a way that it is actuated each time a ball is injected into the flow stream, and this switch controls an electrical counting system. The air to the pneumatically operated motor is controlled by the operator in accordance with the indications of the electrical counting system, so that the number of balls injected can be controlled as desired.

The objects of the invention will be apparent from what has been said above and from the following detailed description of the preferred embodiment of the invention.

In the drawings:

Figure 2 is a cross-sectional view of the feeder of Figure 1;

Figure 3 is another cross-sectional view of a segment of the feeder of Figure 1 and showing the mechanism for actuating the electrical switch of the counting system; and Figure 4 is a side view of the rotor of the feeder of Figure 1.

Figure 1:
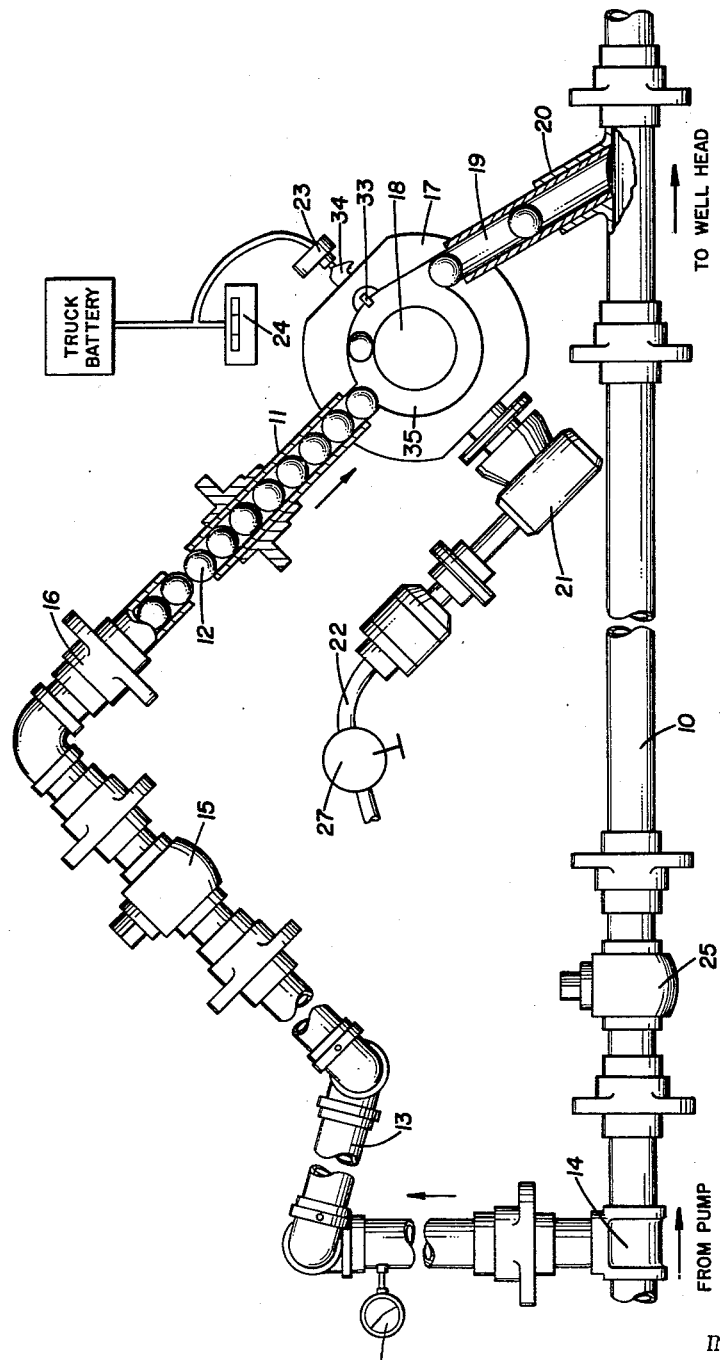
Figure 1 is a somewhat diagrammatic illustration of a flow line with a pneumatically operated feeder system associated therewith, and with an electrical counting system incorporated.

Referring to the drawings in detail, it will be seen that a conduit 10 is provided to conduct fluid under high pressure from a pump (not shown) to an oil well (not shown).

A cartridge 11 containing rubber balls 12 or the like is connected into the fluid system to inject the balls when desired, and in any desired number.

To this end, there is a jointed pipe 13 connected to a T coupling 14 in the conduit 10 and through a valve 15 to a coupling 16 at the inlet side of the cartridge 11.

At the discharge end of the cartridge 11 there is a feeder consisting of a housing 17 and a rotor 18. The feeder discharges into an injector pipe 19 connected to a Y coupling 20 of the flow line 10. As illustrated in Figure 1, the annular space between rotor 18 and housing 17 provides a passage 35 affording pressure communication between cartridge 11 and injector pipe 19. For convenience in illustrating, and because Figure 1 is more or less diagrammatic anyway, the feeder housing 17 is shown at right angles to the position it actually occupies with respect to its pneumatic driving system.

For rotating the rotor 18, there is an air motor 21 connected to an air supply 22, which is connected to the air supply of a truck (not shown).

Also associated with the feeder is an electrical switch 23 connected in the circuit of a conventional electrical counter 24. The source for this electrical system may be the truck battery, as illustrated. The conduit 10 is provided with a valve 25 which, in cooperation with the valve 15 in the parallel connection, may be used to cause the desired differential pressure to be placed upon the balls 12 to make them move into the feeder. A pressure gauge 26 may be placed in the parallel connection.

There is also a valve 27 in the air supply line 22 to the air motor 21 so that the air motor 22 can be started and stopped as desired.

The details of the feeder are shown in Figures 2, 3 and 4. As shown, the rotor 18 may be provided with a groove 28, which is preferably knurled or otherwise roughened as shown in Figure 4. This groove 28 is of such a depth that the balls 12 have to be somewhat distorted from their normal spherical shape in order to pass through the housing 17, as indicated in Figures 1 and 2. The inside of the housing 17 may also be knurled or roughened over the area where the balls 12 come in contact with it.

The shaft 29 of the rotor 18 is connected by a joint 30 to the shaft 31 of the air motor so that it is turned thereby.

To perform the counting operation, the housing 17 is provided with a small shaft 32, suitably sealed, to which a detent 33 is connected. The detent 33 projects inwardly and occupies such a position in the path of the balls through the housing that it is moved once each time a ball 12 passes.

The shaft 32 and detent 33 are biased by a spring (not shown) externally of the housing. Rocking movement of the shaft 32 as the balls 12 pass the detent 33 may be caused to open and close the electric switch 23 (Figure 1), but since this particular mechanism may vary, and since it is well known in the art, no specific form has been illustrated other than the small cam 34 of Figure 1.

The operation of the system illustrated is as follows:

Assuming that the parts have been connected into the flow line 10 as illustrated, and that the valve 25 is open, no balls 12 are being injected into the well.

The valve 25 may then be partly closed and the valve 15 regulated to put a desired fluid pressure behind the balls 12 in the cartridge 11.

The valve 27 may now be opened and this causes the air motor 21 to turn the rotor 18, so that the balls are fed through the injector tube 19 into the discharge of the flow line 10.

As the balls move through the feeder, they successively actuate the detent 33 so that the number of balls injected can be determined at any time by reference to the indicator on the counter 24. The operator may then adjust the valve 27 to slow up or speed up the rate of injection of the balls, and when the right number has been injected, shut the valve 27 off. The entire system thus is one which is adapted to accurate and easy manipulation to inject a large or small number of balls into a flow line subjected to high pressure.

While only one embodiment of the invention has been shown and described, it is obvious that various changes may be made without departing from the spirit of the invention or the scope of the annexed claims.

We claim:

1. In a system for injecting a predetermined number of balls, one at a time and at a desired frequency, into a high pressure flow line conducting fluid to an oil well, the combination of a jointed pipe connected in parallel with the flow line, said jointed pipe having a cartridge containing balls, a rotary ball feeder and an injector pipe connected in series therein, with the injector pipe discharging directly into the high pressure flow line, and the rotary ball feeder including a rotor and a passage affording pressure communication between said cartridge and said injector, valve means for controlling the application of fluid pressure to said cartridge, a motor for actuating said ball feeder to cause the balls to move from the cartridge into the injector pipe with the desired frequency and means between said cartridge and said flow line for counting the balls, said rotor having a groove of such depth that the balls have to be somewhat distorted from their normal spherical shape in order to pass therethrough and said means for counting the balls including a detent projecting into the path of the balls.

2. A system as recited in claim 1 wherein said detent projects into the path of balls passing through said rotary ball feeder, adjacent the rotor groove thereof.

References Cited in the file of this patent

UNITED STATES PATENTS

| | | |
|---|---|---|
| 1,211,738 | Marty | Jan. 9, 1917 |
| 1,999,430 | Townsend | Apr. 30, 1935 |
| 2,011,133 | Yoss | Aug. 13, 1935 |
| 2,306,747 | Ojalvo | Dec. 29, 1942 |
| 2,440,482 | Martin | Apr. 27, 1948 |
| 2,551,477 | Vore | May 1, 1951 |
| 2,634,098 | Armentrout | Apr. 7, 1953 |
| 2,698,582 | Vincent | Jan. 4, 1955 |
| 2,729,206 | Wilson | Jan. 3, 1956 |
| 2,790,500 | Jones | Apr. 30, 1957 |

FOREIGN PATENTS

| | | |
|---|---|---|
| 8,950 of 1894 | Great Britain | Mar. 23, 1895 |